United States Patent [19]

Silverman

[11] Patent Number: 4,497,044
[45] Date of Patent: Jan. 29, 1985

[54] SEISMIC WAVE GENERATOR

[76] Inventor: Daniel Silverman, 5969 S. Birmingham St., Tulsa, Okla. 74105

[21] Appl. No.: 337,678

[22] Filed: Jan. 7, 1982

[51] Int. Cl.³ ............................ G01V 1/02; G01V 1/28
[52] U.S. Cl. ..................................... 367/41; 181/107; 181/111; 181/116; 367/40; 367/57
[58] Field of Search ............... 181/103, 104, 106, 107, 181/108, 111, 116; 367/40, 56, 57, 145, 41, 42; 364/728

[56] References Cited

U.S. PATENT DOCUMENTS

| 1,998,412 | 4/1935 | Prescott | 181/107 |
|---|---|---|---|
| 2,154,548 | 4/1939 | Weatherby | 367/40 |
| 2,808,894 | 10/1957 | Eisler et al. | 181/107 |
| 2,922,484 | 1/1960 | Kelly et al. | 181/107 |
| 2,953,214 | 9/1960 | Merten | 181/107 |
| 2,992,694 | 7/1961 | Musgrave et al. | 181/107 |
| 3,012,625 | 12/1961 | Piety | 367/57 |
| 3,048,235 | 8/1962 | Itria | 181/103 |
| 3,050,148 | 8/1962 | Lee | 181/103 |
| 3,050,149 | 8/1962 | Itria et al. | 181/107 |
| 3,195,676 | 7/1965 | Eisler et al. | 367/40 |
| 3,365,020 | 1/1968 | Walker, Jr. | 181/103 |
| 3,687,228 | 8/1972 | Morris | 181/116 |

Primary Examiner—Maynard R. Wilbur
Assistant Examiner—K. R. Kaiser

[57] ABSTRACT

A seismic wave generator and method of using it, which comprises a vertical array of sources at known spacings, for detonation in a seismic wave propagating medium of known seismic velocity; means to initiate the sources in time sequence in a selected series of known different time intervals and recording the seismic waves at a distant location to provide a first electrical signal; and correlating the first electrical signal with a second electrical signal derived from the pattern of initiation, as modified by the travel times of the waves between the several separate charges.

34 Claims, 14 Drawing Figures

SEISMIC WAVE GENERATOR

CROSS-REFERENCES TO RELATED ART

Reference is made to the following patents and publications:

U.S. Pat. No. 2,609,885, issued Sept. 9, 1952 in the name of D. Silverman.

U.S. Pat. No. 2,808,894, issued Oct. 8, 1957 in the names of J. D. Eisler and D. Silverman.

U.S. Pat. No. 2,779,428, issued Jan. 29, 1957 in the name of D. Silverman.

S. T. Martner and D. Silverman, 1962, Broomstick Distributed Charge. *GEOPHYSICS*, vol. XXVII #6, Part II.

M. E. Arnold and J. W. Haylett, 1981, Delaystick: A New Distributed Charge. *GEOPHYSICS*, vol. 46 #9, September 1981.

BACKGROUND OF THE INVENTION

1. Field of the Invention

This invention lies in the field of seismic geophysical prospecting, and is directed particularly to improvements in the generation of seismic waves and in their processing.

It concerns a seismic wave generator which comprises a vertical array of separate sources at known spacings which are initiated at an arbitrary selected known time sequence, different from that normally provided in a constant velocity type distributed charge.

Still more particularly, it concerns the reception of the series of timed seismic waves after travel throughout the earth, to form a first electrical signal, and correlating this signal with another signal which represents a series of pulses at the known time separations derived from the time sequence of initiations, as modified by the travel times between vertical source positions, of seismic waves in the surrounding medium.

2. Description of the Prior Art

There is considerable prior art both in publications and patents, of the use of long vertical arrays of spaced charges for use in boreholes. However, all of these without exception provide equally spaced charges, in a region of constant known rock velocity, and the equal time intervals chosen for successive detonations is equal to the travel time of seismic waves in the rocks over a distance equal to the spacing between successive charges in the array.

Furthermore, all of these so-called constant velocity, convel, and broomstick charges are detonated from the top downward, in order to concentrate the successive pulses into a single additive pulse which is directed downwardly.

The main basis for this use of separately spaced charges detonated in sequence with the travel time of the seismic wave in the rocks is based upon the principle that the downgoing waves from each of the charges reinforce each other, to provide a seismic pulse, or wave, which is the sum of the separate pulses from each of the charges. The ongoing waves comprise a series of spaced pulses, equal in number to the pulses generated by individual charges, which do not add in any way, but do provide down-going reflections from each of the separate charges which are reflected from reflectors above the array. These reflections complicate the seismic record.

SUMMARY OF THE INVENTION

It is a primary object of this invention to provide a method of generating seismic waves in the earth by an improved arrangement of impulsive sources and different initiation times.

It is a further object of this invention to provide an improvement in seismic wave generation by an array of impulsive sources so that the resulting seismic waves can be detected, recorded and processed to provide a higher signal-to-noise ratio (S/NR) record.

It is a further object of this invention to provide a seismic wave generator which will produce seismic records in a way to minimize ghost signals and converted shear waves.

It is a still further objective to provide a system of constructing and initiating a seismic wave generator in a borehole on land, or in a body of water, in such a way as to get an improved signal, processed to a higher S/NR, and also to provide a separate record of the up-traveling signal which produces ghosts and shear waves.

While this method is applicable to the use of explosive charges, it is equally applicable to arrays of other types of impulsive sources, such as water guns, air guns, gas guns, etc. For purposes of illustration, but without limitation, it will be described mainly in terms of explosive sources.

These and other objects are realized and the limitations of the prior art are overcome in this invention by using a distributed charge, or a linear charge, of spaced explosive units (EUs), and processing the resulting electrical signals in a specific manner, quite different from the prior art.

The seismic sources intended for use in a borehole are constructed in a manner somewhat similar to that utilized in the prior art for constant velocity charges. In the constant velocity charges or "convel" charges, they are generally spaced at equal vertical distances and are detonated by a timing fuse or cord, so as to provide equal time intervals between the detonation of successive charges in the array. These arrays are always detonated from the top charge downwardly, and the timing between successive detonation is made equal to the time of travel of seismic waves in the surrounding wave propagating medium, over a distance equal to the spacing between the successive charges. In this way the seismic wave from the detonation of the first charge reaches the second charge at the same instant that the second charge detonates, so the two seismic waves reinforce each other, and so on, down through the sequence of charges. Thus at the bottom of the array a very strong seismic wave will be generated, to travel downwardly through the earth.

All of these conditions are utilized in the present invention except that in the present invention the spacings between charges can be equal or they can be different. Also, the time intervals between the detonations of adjacent pairs of charges are preferably not equal, but are preferably arranged in a random sequence or in a sequence of time intervals which increase from the first to the last one, or conversely, which decrease from the first one to the last one.

When a vertical sequence of charges are detonated at unequal time intervals, which time intervals are preferably greater than the time of travel of seismic waves between adjacent charges, a downgoing seismic signal in the earth will be in the form of a time series of pulses, which are in the time sequence of the detonations but modified by the times of travel of the seismic waves between adjacent pairs of charges. Since the spacings of the charges, the velocity in the adjacent medium, and the sequence of time intervals between detonations are known, a time series can be calculated which is precisely equal to the time series represented by the sequence of seismic wave pulses traveling downwardly, and similar to the signal that would be provided by a geophone positioned below the array.

These seismic waves follow identical paths one behind the other and at a reflecting horizon will be reflected upwardly, in the same time pattern to the surface and will be recorded on one or more seismic sensors, or geophones, converted to electrical signals, and temporarily stored or recorded.

Knowing the precise time intervals between these seismic waves as they leave the bottom of the array, it is possible to correlate the received electrical signals from the geophones with this time pattern, to provide a first correlogram. This first correlogram then provides a record which is more or less similar to that provided by the vibroseis type of operations currently in use.

Referring to the vibroseis operations of the prior art, it is well known that given a series of seismic impulses such as a plurality of timed detonations of small charges, it will provide a higher signal-to-noise ratio (S/NR) record if the received record is correlated with the time sequence of pulses, rather than if successive pulses are delayed and stacked. On this basis, detonating an array of separate spaced charges in a borehole in a known time pattern, and correlating the received record with this time pattern, will provide a seismic record of higher S/NR than would be provided by the prior art system of adding, or stacking, the separate seismic signals from the detonations of the separate charges.

It will be clear that from the preceding description, the resulting record will have improved quality over that which would be produced by a conventional constant velocity charge. Furthermore, this process just described will be fully as useful as the constant velocity charge, in delaying the upgoing pulse from the series of detonations, so that the effect of reflections from horizontal reflectors above the charge will be minimized. Another way of saying this is that ghost reflections will be minimized by this method as they are with the constant velocity charge method, but to a greater degree.

However, there is a further important advantage of this present invention over that of the constant velocity charge. This involves the capability of detecting, by means of a surface geophone at the shot point, the sequence of up-going pulses from the downward detonation of the charges. This second sequence of pulses represents a seismic wave pattern which travels upwardly and is reflected downwardly from horizontal reflectors above the source, and produces ghost reflections, precisely as does the pattern of waves going upwardly from a constant velocity charge. However, in this case, the precise timing, as indicated on the uphole geophone, is known, and can be correlated with the received record. The resulting correlogram will provide a record which is based upon the downgoing reflections from the upper reflectors being the source for the record.

This procedure provides an improved record over the conventional constant velocity charges, and also provides a second record which indicates clearly the ghost signals. These two records when provided at each shotpoint, and carried out over a prospect, will provide two maps which should be in agreement, provided the difference in timing of the two sources, that is, the downgoing source, and the upgoing source, are properly taken care of.

One way of determining the time interval between the two records, that is, the one generated by the downgoing pulse stream in a conventional manner, and the other generated by the upgoing pulse stream in this invention, is by correlating the first correlogram with the second correlogram, in a well-known manner.

Summarizing some of the details of what has been described, the number of series charges in the array is preferably comparable to those in prior art constant velocity charges. The spacing between charges can be any desired value. Furthermore, the two time series, provided by the downgoing pulses and upgoing pulses from the charge array, differ in timing from each other by twice the time of travel of seismic waves over a distance equal to the spacing between charges. Since these two time patterns are going to be separately correlated with the received record, the larger this spacing, the more perfectly will the two sets of signals be separated by the correlation process. Also, the larger the number of charges, the better the separation.

The arrays can be detonated from the top down, or from the bottom up, with equal benefit in the records. This indicates that this process is quite different from that of constant velocity charges which must be detonated from the top only.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

Figure 1:
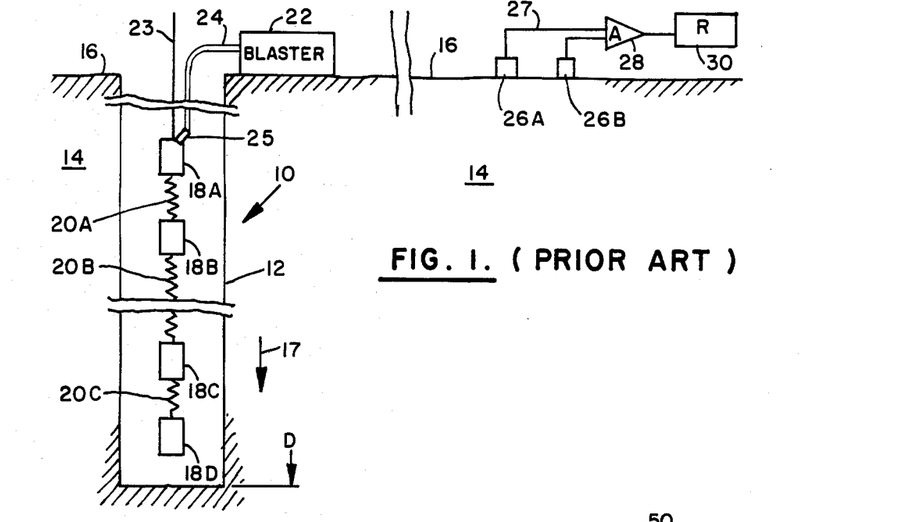
FIG. 1 is a representation of a prior art constant velocity type distributed charge for use in a borehole in the earth.

Referring now to the drawings and in particular to FIG. 1, there is shown a prior art drawing of the normal type of constant velocity (convel) distributed charge for use in a deep shothole. The purpose of this figure is to illustrate the status of the present-day prior art, so that the differences between this prior art and the present invention, which will be described in conjunction with the following figures, can be better understood.

There is a borehole 12 drilled to a selected depth D in the earth 14, having a surface 16. The charge array is indicated generally by the numeral 10, and comprises a series of a selected number of separate small charges, or explosive units (EU). These separate charges 18A, 18B, 18C, 18D, etc. are attached to a strength member 23, which may be a cable, or it may be a sequence of wooden poles or plastic cases, which together form a substantially rigid long linear object. In the prior art the most common method of detonation of the charges is by means of fuse-type timers will known in the industry. This is indicated generally by the numerals 20A, 20B, 20C, etc. An example of this type of timing cord would be primacord, as in the conventional "broomstick" charges, and Primeline, and Nonel cord, well known in the industry. These are manufactured by the Ensign Bickford Co.

The detonation of the sequence of separate explosive units is by means of a cap 25 in the top unit, connected by wires 24 to a blaster 22 of conventional design. When the blaster is operated, the cap 25 in the top unit 18A will detonate the succeeding explosive units. Generally the spacing between separate charges 18A, 18B, etc. are equal and the entire array of explosive units is positioned opposite a rock or other wave transmitting medium of constant known velocity. The overall length of the array is generally of the order of 100 feet, this is an arbitrary length but it permits the use of eleven charges with 10 foot spacings between them, which appears to give satisfactory operation, as a distributed charge. Keeping the same overall length, the operation of the distributed charge is improved by having a greater number of individual explosive units correspondingly closer spaced, until a continuous explosive unit is configured, "broomstick charge", so as to have the desired velocity of detonation of explosive cord equal to the velocity of seismic waves in the surrounding seismic wave transmitting medium. In all cases for distributed charge operation, the direction of detonation is from the top unit 18A downward to the bottom unit 18D, in accordance with arrow 17. The time between the separate detonations of charges 18A and 18B, for example, is designed to be equal to the time of travel of the seismic wave generated in the earth 14 by the first charge 18A to arrive at the position of the second charge 18B. By this means, each of the seismic waves generated by the charges will be in-phase with the passage of the seismic wave from the preceding units and they will all be summed or stacked to provide a total seismic wave moving downwardly below bottom unit 18D, and having an energy equal to the sum of the energy of the individual separate explosive pulses from each of the units.

Figure 2:
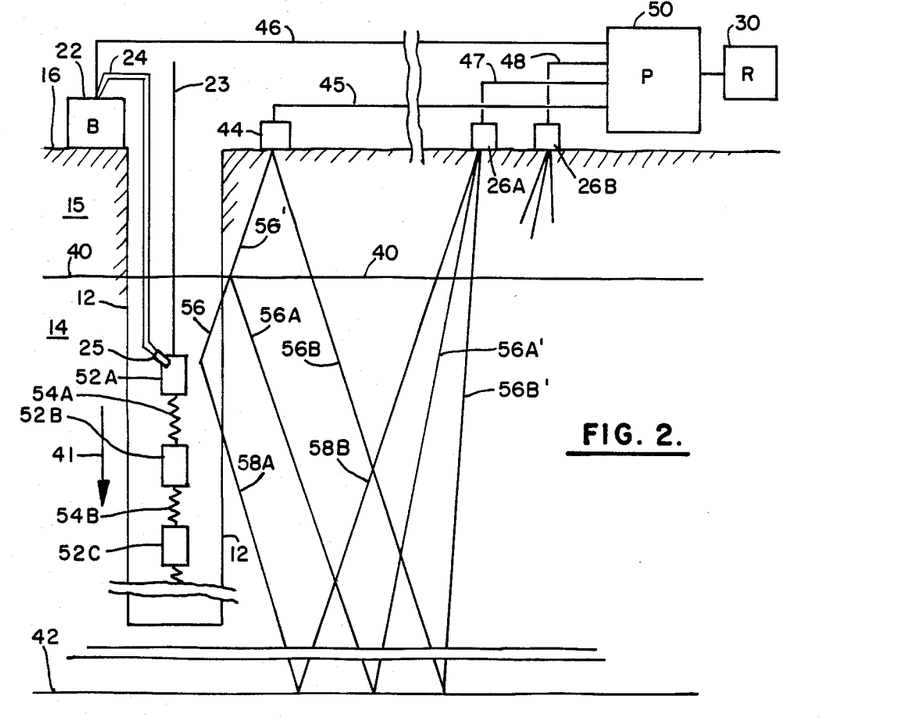
FIG. 2 is an illustration of this invention which utilizes an array of separate spaced explosive units, illustrating the various paths of seismic waves which are involved.

In FIG. 2 is illustrated one embodiment of the present invention. It still utilizes a borehole, or shothole, in the earth 14, having a surface 16. It can also be used in a body of water. Also shown is a geologic interface 40 which separates the weathered layer 15 from the subweathered layer 14. Energy moving upwardly from below the interface 40 will be partly reflected downwardly at that interface 40, and the energy which does not reflect will move upwardly to the surface 16 and will be downwardly reflected there, as will be further explained.

An array of explosive units 52A, 52B, 52C, etc. is illustrated, positioned below the interface 40 so that the entire unit will be in a rock body 14 of known constant velocity. While only three such explosive units are shown, there can be any number, but preferably there should be at least of the order of five to ten separate explosive units, stretching over an interval of the order of at least 100 feet.

The listing of the preferred value of the number of the explosive units as ten or more, and the spacings of 10 feet and of total length of 100 feet, are only for purposes of illustration, and are not to be taken as a limitation, since the explosive units can be positioned closer or farther apart, and the length of charge can be much less or much greater, and so on.

The separate explosive units 52 are supported by a tension means 23 which can be a tension cable, or tube or rod, of paper, wood or plastic, as has been used in the conventional convel units as shown in FIG. 1. The purpose of the tension member 23 is to lower the charge, and support it at a selected depth in the borehole 12 until it is detonated.

The explosive charge illustrated in FIG. 2 is also of the type as indicated in FIG. 1. It uses timing fuse 54A, 54B, etc. to provide the delayed detonation of succeeding explosive units. This illustration indicates a series of explosive units detonated from the top. This is taken care of by providing a conventional blaster 22 with leads 24 going to a cap 25 in the top explosive unit 52A. Once the blaster is operated the top unit will detonate and the successive units will detonate in accordance with the delay introduced into the fuse or delay elements 54A, 54B, etc.

There is one important difference between the explosive array in FIG. 2 as compared to FIG. 1. In FIG. 1 all of the explosive units are equally spaced and the timing fuse provides a delay equal to the travel time of seismic waves in the rock wall, over a distance equal to the spacing of the explosive units.

In FIG. 2 while the delay units are used, they provide a much greater delay than that which would be equal to the travel time of a seismic wave in the wall. This will be illustrated further in connection with FIG. 7. While the individual charges create their own seismic waves, I have shown only a single seismic wave 58A going downward from the top unit 52A. However, since the distance from the charge down to the reflection interface 42 is so large compared to the overall length of the explosive assembly that the ray 58 can be assumed to be the pattern of seismic pulses, constituting the signal going downward from the array to the reflecting interface 42, and moving upwardly according to ray 58B to a sensor or geophone 26A. There will, in general, be a large number of sensors 26A, 26B, etc. although only two are shown, and the rays to one of them are shown, in the interest of keeping the diagram simple. This surface instrumentation is all conventional.

Each of the individual explosive units creates its own seismic wave; and as just explained, ray 58 represents the series of separate impulses from the separate explosive units that go downwardly. These separate units each create spherical seismic waves, so there is another series of seismic impulses 56 that goes upwardly, as well as others which go sideways, which are of no interest at the moment. The up-going series of pulses 56 will partially reflect at the interface 40, the bottom surface of the weathered layer, and will then move downwardly in accordance with ray 56A; and part of the energy in ray 56 will reach the surface as 56' and be reflected downwardly, as before, as ray 56B. Consequently, as a result of this explosive array there could be at least two sets of seismic pulses 58A and 58B, from the down-travelling aeries of pulses, and 56A, 56A', 56B, and 56B' from the up-going series of pulses.

One of the advantages of the constant velocity distributed charge illustrated in FIG. 1, put up by its proponents, is that the sum of the detonation waves from each of the plurality of explosive units are summed by the process of timing the detonations in accordance with the downward movement of the seismic wave. Thus more energy goes downwardly than goes upwardly. This is not quite correct because the same amount of energy would go in each direction. However, the power configuration of the seismic waves will certainly be different, and the power represented by energy per unit of time in the downgoing signal 58A will certainly be greater than the power represented by the upgoing signal 56. I point this out because there is no way of eliminating the upgoing energy. But while it is reflected downward in the form of ghost waves, because of their distribution over a period of time, the low energy of each individual pulse makes them less prominent, and therefore, they constitute simply a noise through which the record must be interpreted.

FIG. 2 illustrates that the total energy that goes up as ray 56 is of the same order of magnitude as the ray 58A going down, but it is broken up into one or more packages, each of which occur at still later times. Thus, the result is a large number of separate small pulses which come in a time pattern.

In this invention, neither of the rays 58A or 56 are summed in the ground. They are both time series, each having a plurality of pulses, one for each of the separate explosive units. However, the time pattern of the downgoing series 58A will be different from that of the upgoing series 56. While the detonation times are fixed for each of the units, the way they combine into a time series depends upon their physical position and the velocity of seismic waves in the rock. This will be discussed fully in connection with FIG. 7, but I point out here that the various rays which I have described in connection with FIG. 2 are substantially the same as would occur in FIG. 1, except that the delay times introduced by the means 54 are quite different in FIG. 2 than they are in FIG. 1.

In this invention, instead of summing the separate waves from each of the explosive units, a single record is formed which includes each of the separate waves or pulses in a known time pattern. The pattern of pulses in the record is then correlated with a known pattern of pulses. This provides a higher signal/noise ratio final processed record, than would be the case where the waves are summed.

Since control of timing of the detonations of each of the units 52 is under control of the operator, if the spacing between charges is known and the velocity of seismic waves in the rock is known, the actual timing of pulses in the downgoing direction is known. Thus, the record can be correlated with this known pattern to provide a correlogram, which is a final record.

Shown in FIG. 2 is a geophone 44 placed on the surface 16 near to the borehole 12. This geophone is connected to a signal processing box 50 by lead 45, as are the signals from the geophones 26A and 26B, etc. by leads 47, 48, etc. Also, the firing time of the top charge 52A as a time break, is carried by lead 46 to the processing box 50. Here the signals are amplified and stored and correlations made, etc. providing permanent records with a recorder 30. This is all conventional.

The signal on line 45 from the geophone 44 will consist of a series of electrical pulses timed according to the uptraveling pattern of seismic waves. In other words, the output of geophone 44 represents a time function of time spaced pulses, which when correlated with the record taken from geophones 26A, 26B, etc., will then provide a correlogram which will show the uptraveling waves in the rays 56 subsequently reflected downwardly as rays 56A and 56B, for example. Thus, having the timing of the upgoing pulses as read by the geophone 44, the record can be correlated with this pattern of pulses to provide a picture of the energy in the ghost reflections.

This can be very useful since it represents a body of energy, which has heretofore been wasted. Thus the correlogram provided by the process described, that is, correlating the received record from the geophones 26 by the signal on line 45, will provide a second correlogram similar to the first correlogram, which will be a record showing only the once reflected energy as the source of seismic waves.

By correlating these two correlograms there will be evident a time difference between the patterns in the record which is a function of the time of travel from the top explosive unit 52A upwardly to the base of the weathered layer, and to the surface, and back down to the level of the top explosive unit. It will be clear therefore that this invention permits not only obtaining an improved seismic record resulting from the detonation of the distributed charge shown in FIG. 2, but it also provides a second record which is a record comprising a different source; namely, the uptraveling waves 56 from the explosive array, and these two records together will provide more information for the geophysicist than the first one alone.

Figure 3:
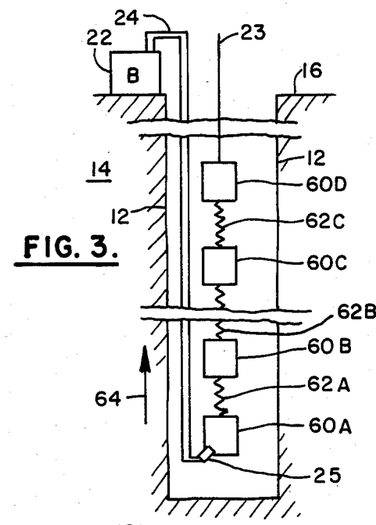
FIG. 3 illustrates an array according to the principles of this invention using timing fuses arranged for uphole shooting.
Figure 4:
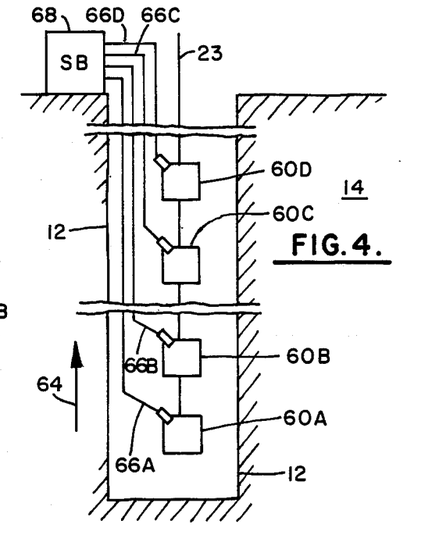
FIG. 4 illustrates a similar array of explosive units arranged for uphole shooting by means of a sequencing blaster at the surface.

Referring now to FIGS. 3 and 4, there are shown similar explosive arrays in the borehole 12 corresponding to that of FIGS. 1 and 2. In the process of FIG. 1, it is only possible to get a summed explosive effect by detonating the set of explosive units downwardly starting from the top.

In this invention the time intervals between the detonations of successive explosive units have been increased. It is no longer of interest to sum these effects in the earth. Therefore, by choosing proper time intervals relative to the time of travel of the seismic waves in the earth, it is possible to detonate the charges upwardly or downwardly.

FIG. 2 shows how this can be done by detonating downwardly. FIG. 3 shows the same explosive array as in FIG. 2, but turned upside down, and detonated at the bottom. It will be clear by comparing them precisely, that ray 56 will move downwardly, and the ray 58 will move upwardly. So far as the final results are concerned, there would not be any substantial difference.

FIGS. 3 and 4 show two methods by which upwardly directed detonations can be provided. Referring now to FIG. 3, there is shown the same borehole 12 in the earth 14 and surface 16 with a blaster 22 and cap leads 24 attached to the cap 25 in the bottom unit 60A, and having other explosive units 60B, 60C, 60D, etc., for example. All of these are tied to a tension member 23. The timing is by means of the fuse cords 62A, 62B, 62C, etc., such as was used in FIG. 2.

One of the features of the array of FIG. 1 is that it takes a considerable amount of effort and material to provide the selected time interval between detonation. Once they are built into the explosive units they cannot easily be changed. Consequently, I illustrate in FIG. 4 how a sequencing blaster 68 can be used to detonate a sequence of explosive units 60A, 60B, 60C, 60D starting at the bottom end, by placing caps in each of the charges, and using cap leads 66A, 66B, 66C, 66D, etc. from each one to the blaster 68. The caps are detonated electronically, in a well-known manner, such as will be shown, for example, in FIG. 6. Thus, the simplicity of FIG. 4 is provided to produce an upwardly detonating charge in the earth which is equally useful to the downward detonating charge as shown in FIG. 5.

Figures 5, 10C, 10D, 10E:
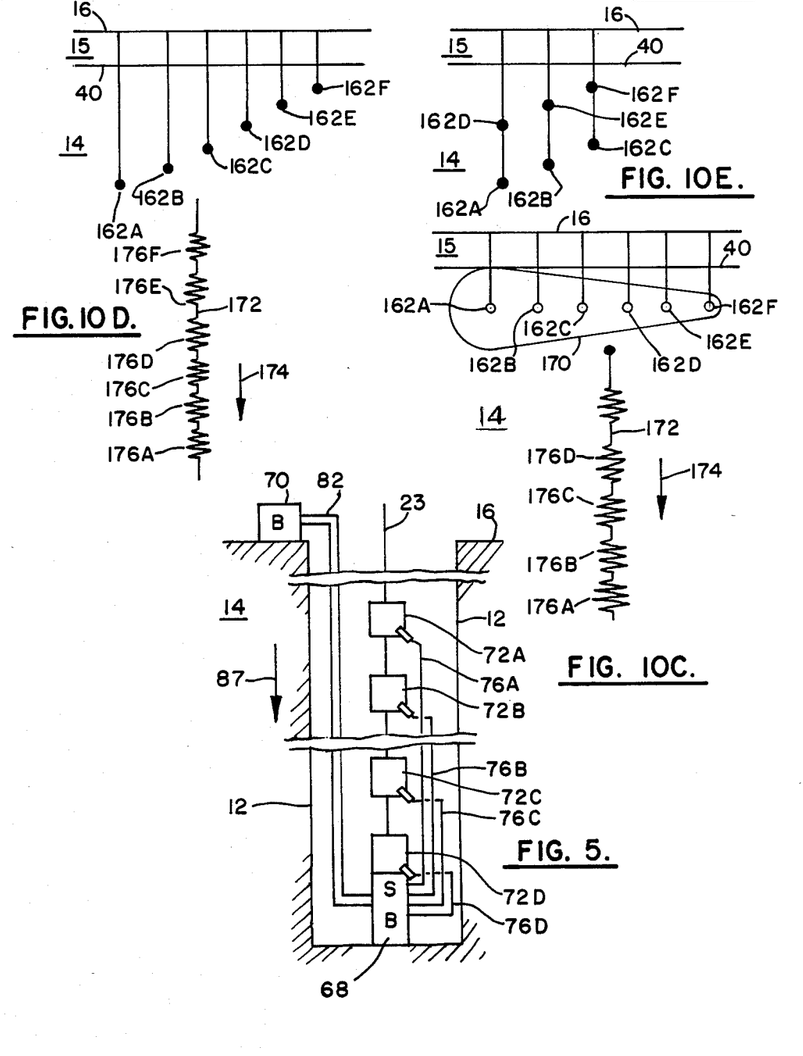
FIG. 5 illustrates another embodiment of this invention utilizing an array of explosive units and designed for downward sequencing of detonation by means of a bottom hole sequencing blaster.
FIGS. 10A, 10B, 10C, 10D and 10E illustrate various arrangements of explosive units in land seismic operations detonated in time sequence.

In FIG. 5 is shown how a sequencing blaster 68 can be attached to the bottom end of the array 23, and by using a simple blaster 70 at the surface, the array can be fired by providing electrical power from the surface, firing first charge 72A, then 72B, then 72C, 72D, etc. While the explosion of the topmost explosive unit will cut the cap leads 82, this will not prevent the full operation of the cycle since that has been taken care of in the blaster 68.

Figure 6:
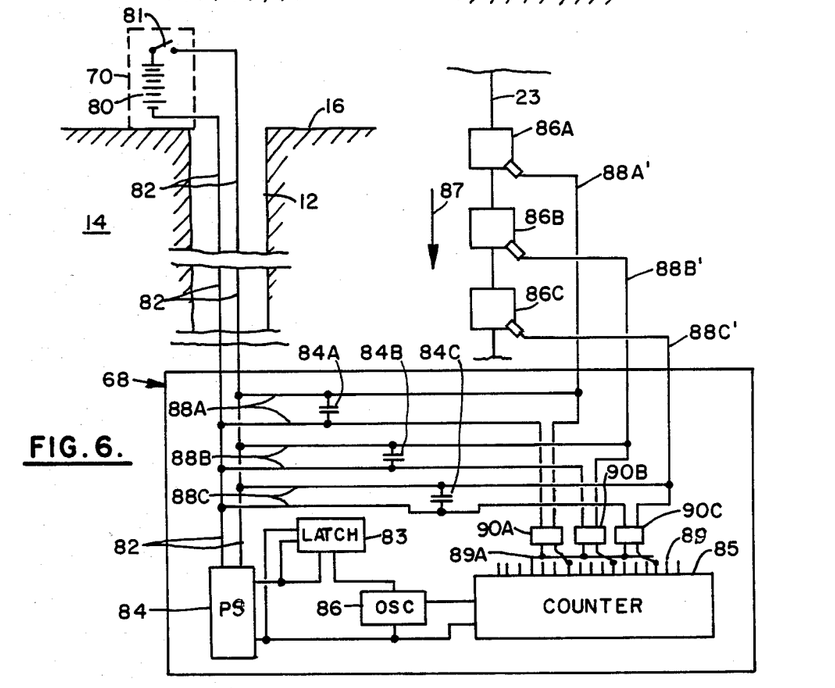
FIG. 6 is a more detailed illustration of the system of FIG. 5 in which the details of one embodiment of a sequencing blaster are illustrated.

Referring now to FIG. 6, there is an illustration of one embodiment of a sequencing blaster, which when mounted at the bottom of the hole can provide a sequence of detonations in a downward direction as illustrated by the arrow 87. The blaster 70 at the surface shown in dashed outline contains a battery 80 and the switch 81 and provides two conductor wires 82 to the sequencing blaster shown in the box 68.

It is, of course, of great interest to provide the safety of having no electric power in the blaster 68 while it is connected to capped charges and being lowered into the hole. Thus, all of the electrical power is supplied down the two conductors 82 to the blaster 68 after the charge is in position in the shothole. The first thing that happens is that the energy from the battery 80 charges up capacitors 84A, 84B, 84C, etc., one in each of the lines 88A', 88B', 88C', etc. to each of the caps in each of the charge units 86A, 86B, 86C, etc.

The first thing that happens when the switch 81 is closed is that the cap circuits are now provided with detonation voltage. At the same time the voltage of battery 80 charges a corresponding capacitor in the battery box of the power supply 84. The counter 85 is energized and has a series of output posts 89 each representing a selected count. A selected post 89A is connected to each of the relays 90A, 90B, and 90C, etc. A selected time delay provides opportunity for all the capacitors 84 to be charged and the power supply 84 to be normalized. Then as the counts continue the second lead of the relay 90A will be energized. That relay will latch in and will detonate the top charge 86A over lead 88A'. Similarly at a later predetermined known time, the second relay 90B will close and will detonate the second charge, and similarly, for the third charge, and so on.

Means can be provided at the surface, before the charge goes into the hole, for adjusting these times for the time programming. However, it is also possible to preset these in the process of assembling the blaster to a fixed time pattern if that would be desirable. Thus, by means of a device of a sort illustrated in FIG. 6, a string of charges 86 can be detonated from the top down in any desired time sequence.

Of course, the sequence blaster 68 will be destroyed by the detonation of the explosives. However, with present-day instrumentation, the cost of these would be quite small, and it would be possible to make them expendable. As previously explained, it is not necessary to have this array detonated downwardly; and, of course, this same blaster of FIG. 6 when used in conjunction with FIG. 4 could be used indefinitely for exploding the array from the bottom up. That would be a perfectly satisfactory way of operating.

Figure 7:
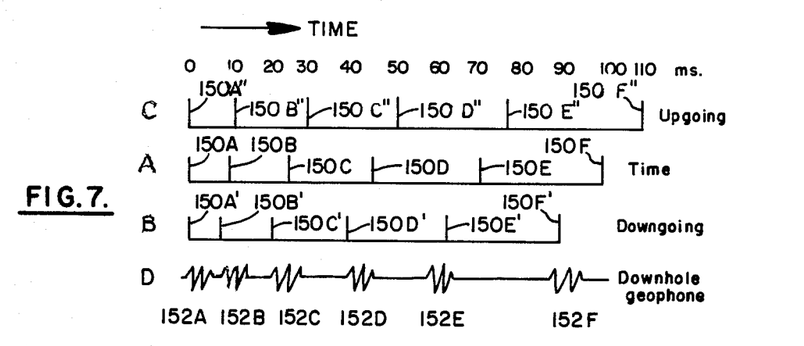
FIG. 7 illustrates the time functions and seismic wave trains that are produced by initiating vertical arrays of sources in timed sequence.

Referring now to FIG. 7, there are four traces A, B, C, and D which represent time sequences and seismic traces as they might be recorded on an uphole geophone, or a downhole geophone.

If we assume that an arbitrary time pattern is impressed on the system; namely, a first interval of 10 milliseconds, a second interval of 15 milliseconds, 20 milliseconds, 25 milliseconds, 30 milliseconds, and so on, the trace will look substantially like trace A of FIG. 7. The spikes labeled 150A, 150B, 150C, 150D, 150E and 150F represent time intervals with the respective time spacings that have just been stated.

Assume for a moment that the charges are placed 10 feet apart in a medium for which the seismic velocity is 5,000 feet per second. It will take the seismic wave generated by the first uppermost charge 2 milliseconds to move downwardly to the position of the second charge; and at the end of 10 milliseconds when the charge is detonated, the wave front from the first charge will be 8 milliseconds ahead of it. Thus because of the time for travel down from the uppermost charges, the actual time intervals between seismic trace as would be recorded on a geophone positioned at some distance below, the lowermost charge unit will now be spaced, instead of 10, 15, 20, etc., at intervals which are 2 milliseconds less, that is, the intervals will now be for the downgoing time function 8 ms, 13 ms, 18 ms, 23 ms, and 28 ms, as shown by spikes 150A', 150B', 150C', 150D', 150E', and 150F'.

This is represented in the trace B. This would be the timing of the downgoing seismic waves for the times of initiation as given by trace A.

Now consider the upgoing wave train. Starting with the uppermost charge and detonating it and then 10 milliseconds later detonating the next one down, the second pulse will have to travel for 2 milliseconds to get to the position of the point of detonation of the first one, and so there will be 2 milliseconds added to each of the time intervals at which the detonations take place. Thus the interpulse time intervals of the time function going upwardly as would be recorded on a geophone positioned at the surface, would be 12 milliseconds, 17, 22, 27, and 32 ms. This time spacing is shown in trace C, in accordance with the spikes 150A'', 150B'', 150C'' and so on. It is thus seen that by vertically spacing the charges, there are two time functions which are different, one going downwardly and one going upwardly, and then reflecting downwardly. The two separate records formed by these two separate time functions can be separated since they are formed by two time functions which are different from each other.

If the array of explosive units could be detonated in any way so that only the downgoing pulses as indicated in trace B were present, then that would provide a record entirely free of ghost reflections. This would be very desirable, but is impossible with present-day art.

On the other hand, if only the upgoing time function were present, then another record would be obtained which would be identical to the ghost reflections and could comprise a record similar to that which would be provided by the downgoing time function alone, except that it would be delayed by a time of travel which could be calculated by the dimensions from the top explosive unit to the surface and back, and so on, as is well known in the art.

Now having the two different time functions, it is possible to separately correlate the received record with the two time functions. Correlating the record with the downgoing time function would provide the part of the record which would be free of ghosts. Secondly, the received record could be correlated separately with the upgoing time function, and that would provide a second record which would be similar to one which was recorded as a result of the downgoing time function alone.

After correlation by these two time functions we would have respectively two correlograms which would look very similar except one would be delayed by a time corresponding to the additional time of travel of the upgoing and downwardly reflected time function. This timing difference could be determined by correlating the first correlogram against the second correlogram which would give a third correlogram, which would give a measure of the time difference between the two separate records. By time shifting the second correlogram by the time interval indicated on the third correlogram and reversing its polarity, it should be substantially identical to that of the first correlogram. Thus the two can be added to provide additional improvements in signal-to-noise ratio. Alternatively, the second correlogram can in reduced amplitude be subtracted from the first correlogram to remove any ghosts which might be present.

While I have described this invention up to this point as an array of explosive units (EUs), or other impulsive sources (ISs) in boreholes in the earth, they can, of course, be positioned in vertical arrays in other wave propagating media, such as in a large body of water, such as in the case of seismic offshore prospecting.

Figure 8:
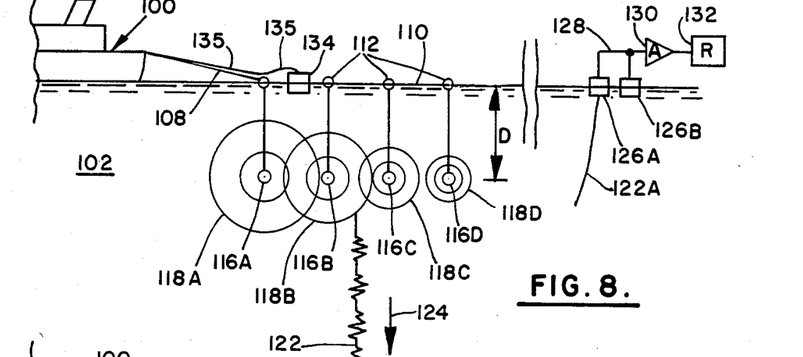
FIGS. 8 and 9 illustrate horizontal and vertical arrays of impulsive sources in offshore seismic operations initiated in time sequence.
Figure 9:
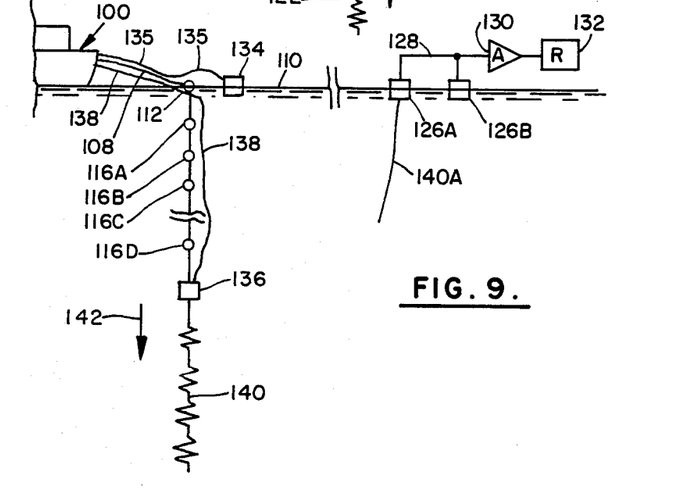

In FIGS. 8 and 9 I show two illustrations of how multiple sources which might comprise air guns, water guns, or gas guns, are utilized in offshore seismic prospecting. Generally these separate sources are strung out behind the tow boat, indicated generally by the numeral 100 in FIG. 8, and supported by means of floats such as 112 floating on the surface 114 of the water 102. The floats support individual impulse sources such as air guns or water guns, which are suspended below the individual floats at a desired depth in the water, by means of cable 111.

Normally these several ISs are detonated, or initiated, simultaneously so that all of their output seismic waves which they generate will be in-phase and will propagate downwardly as a sum of the individual seismic waves of each of the sources.

In some cases in order to get a desired wave front it is necessary to ensure that the output signals from each of the separate units are identical.

Rather than initiate these impulsive sources simultaneously, I prefer, as in the teachings of this invention, to time the initiations of the separate ISs in accordance with a time pattern such as shown in trace A of FIG. 7. By initiating first the source 116A, then 116B, 116C, 116D, etc., a series of wave fronts are produced as indicated by numerals 118A, 118B, 118C, and 118D respectively. These would produce a downgoing seismic wave train or signal indicated by the numeral 122 which would be moving downward in accordance with the arrow 124. This time function 122 consists of a series of separate seismic pulses which together form a signal similar to trace D of FIG. 7. This time function can be correlated with the received record to provide a resulting correlogram which would be a record of higher signal-to-noise ratio.

Of course, it will be clear that if all of the sources are at the same vertical position in the medium, such as the water, then the upgoing signal from these charges will be a time function identical to the downgoing time function. Thus it will not be possible to separate the ghost reflections from the primary reflections on the record as was discussed previously in connection with FIG. 2, and so on.

Consequently, I prefer to use a vertical array of ISs as shown in FIG. 9, which are spaced apart in a manner similar to the separate sources in FIG. 2 and other figures previously discussed. Thus a tow cable 108 is provided from the tow boat 100 and provides power, pressurized air and/or pressurized water, etc., to the array of sources 116A, 116B, 116C, 116D, and so on. This is supported from a float 112 in a similar manner to that shown in FIG. 8.

Also, there is a geophone 134 positioned at or near the surface of the water which will record the upgoing seismic waves and carry the signal over line 135 to the recording apparatus in the boat.

Also, I have shown a "downhole" geophone 136 which is positioned below the lowermost source 116D. This then would record the downgoing time function in a manner similar to the recording of the upgoing time function by geophone 134. Consequently, we now have, as recorded by 136, trace D of FIG. 7 and by the geophone 134 an upgoing trace which would be similar to D, except at the time intervals corresponding to trace C. The data acquired in FIG. 9 would be similar to that acquired by the apparatus in FIG. 2 and would be processed in a similar manner. Similar to FIG. 2, there is shown in FIG. 9 the uptraveling reflection or seismic ray 140A which represents the received signal from deep reflections, to geophone 126A which goes by cable 128 to an amplifier 130 and recorder 132 in a manner similar to the manner in which near surface seismic detectors can be used in offshore prospecting. Normally the sensors 126A and 126B would be in a so-called "seismic streamer" which is towed behind the ship and cables connect each of the seismic sensors to the boat, where the signals are amplified and recorded, etc.

In FIG. 9 I show a geophone 136 connected by cable 138, positioned below the lowermost source unit 116D. This is ideal since, irrespective of the relative spacing between the geophones, it is possible to get a record which will indicate the true nature and timing of the downgoing seismic wave train. Just as in the case of FIG. 2, the uphole geophone 44 recorded the upgoing seismic wave train. In the borehole it is obviously very difficult to position a geophone in the same shot hole as the charge array, and since it would require an additional shot hole drilled to a depth below the one which contains the charge, it is unlikely that such a hole would be provided because of the cost of drilling. Consequently, it is more important in working with a shot hole to know the precise spacing and the precise velocity of the surrounding medium.

Referring briefly to FIG. 7, it is, of course, possible to correlate the spike traces B and C separately with the received record. However, it would be better to utilize a trace like trace D, which would have seismic wavelets spaced at the corresponding times of the spikes. This can be provided as is well known in the art, by convolving the spike traces B and C with wavelets of selected period. Of course, another way of getting this is to provide an uphole geophone and a downhole geophone as has been shown in FIG. 9.

Figure 10A:
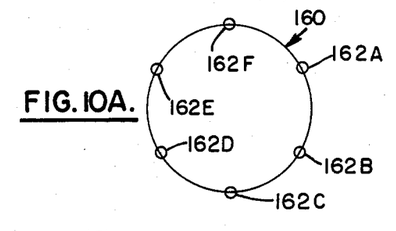
Figure 10B:
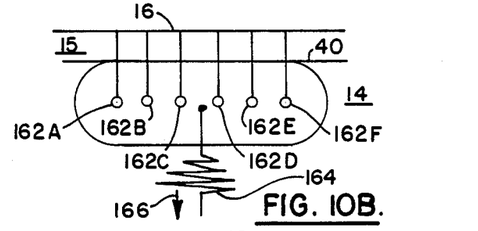

There is still another area of application of this invention, and that concerns the type of seismic operations in record areas where it is very difficult to get sufficient energy into the ground because of near surface geological conditions. In such instances it has been customary to drill a plurality of 8 or 10 or more shot holes arranged for convenience in a circle, of a diameter which is less than the dimensions between adjacent recording traces on the seismic geophone array. It is found to be more satisfactory, where a very large charge such as 100 pounds or more of dynamite is required, to shoot fractions of that amount, in each of a corresponding number of shot holes. However, it has been customary to detonate all of these charges at the same instant as has previously been explained by the use of air guns or water guns in offshore work, where they are also detonated simultaneously. In other words, the situation might be as that in FIG. 10A, where there is shown a group of 6, for example, shot holes 162a, 162b, 162C . . . 162F arranged in a circle 160. In FIG. 10B is shown a vertical section through the earth with each of the charges spaced along a line instead of around a circle. The charges 162A, 162B, 162C . . . 162F are arranged at the same depth which would normally be below the base 40 of the weathered layer 15, in a medium 14 of substantially constant known velocity. By dividing the entire charge up into smaller charges, more energy is generated in the seismic waves than if all of the charges were loaded into a single shot hole and detonated simultaneously. In this case, the downgoing seismic pulse would be like that indicated by numeral 164, and would travel downwardly in accordance with arrow 166.

Referring to FIG. 10C, as in the case of FIG. 8, it is, of course, possible to detonate the sources as in FIG. 10B in a time pattern similar to that provided in FIG. 8. Thus, although the sources are all at the same level, the downgoing seismic wave signal will be a series of time space separate wavelets 176A, 176B, 176C, etc. which would be similar to that which would be provided by the array of guns in FIG. 8. The wave front 170 indicates by its nonsymmetrical shape as compared to that of FIG. 10B that the sources are detonated in time sequence rather than simultaneously.

Although the downgoing pulse 172 looks very similar to that shown in FIG. 9 by the numeral 140, the difference is that the upgoing pulse from this same array of FIG. 10C would be identical to the downtraveling pulse and there would be no way of separating out from the received record the direct waves and the ghost waves and their effect on the record. Of course, surface wave noise would be reduced.

Therefore, in FIGS. 10D and 10E I prefer to drill the separate holes such as in FIG. 10D to greater depths, where 6 holes are drilled, and the shot 162A, 162B, 162C, and so on are positioned at different depths corresponding to that of FIG. 9. They are not precisely in the same shot hole, but they are nearby, and would have identical results. Of course, if the separate explosive units 162A, 162B, etc., were small enough they could all be placed in the same borehole as that shown in FIG. 2. However, in this particular field of application the charges may be quite large, and it is believed that there would not be satisfactory operation if they were all placed together in a single borehole. However, it might be possible instead of providing a full six boreholes as in FIG. 10D for the six charges, to provide three boreholes; and by separating the charges into two groups, there would thus be a spacing of some 30 feet between the two charges in each shot hole. Of course, it would be possible also to have two shot holes with three charges in each one. Thus, that type of operation might be satisfactory.

What has been described is a new method of initiating separate impulsive sources such as explosives, gas guns, water guns, air guns, and so on, whether in the ground or in water, in a time sequence rather than simultaneously, to provide a much improved record over what could be obtained if they were initiated or detonated simultaneously.

Furthermore, if they are positioned in a vertical spaced array, it is then possible to obtain two records, one comprising the information generated by the downgoing seismic wave trian, and another record resulting from the upgoing seismic wave train, which would generate a record based upon the ghost reflections. These then could be used separately or together to provide an improved amount of seismic information, or the record made by the upgoing time function can be time shifted and subtracted from the original record.

While I speak of time patterns with which to correlate against the received record, I prefer to utilize seismic time functions which are spikes convolved with a seismic wavelet of substantially the same period as that in the field record. Another way of deriving such a time function would be by means of an uphole geophone or a downhole geophone and so on.

This method is applicable to vertical arrays on land, to horizontal arrays on land, to horizontal arrays in water, and also to vertical arrays in water.

In this description of the invention, I have described the seismic wave receiving and processing instruments as conventional. These conventional instruments can be divided into two basic types. They are those that operate with large power sources, and digitize their signals to multibit form, generally 16 bits, or more, and those that digitize their signals to 1 bit. This invention is ideally suited to both of these conventional systems.

While the invention has been described with a certain degree of particularity, it is manifest that many changes may be made in the details of construction and the arrangement of comonents without departing from the spirit and scope of this disclosure. It is understood that the invention is not limited to the exemplified embodiments set forth herein but is to be limited only by the scope of the attached claim or claims, including the full range of equivalency to which each element thereof is entitled.

When I speak of arrays of sources in the earth, I mean to include both land and water covered areas. And when I speak of a vertical array, I mean an array that is generally vertical, but not truly vertical. Since the downtraveling pulses move substantially coaxially with the array, if the axis of the array is away from the vertical, the intervals between pulses may have to be modified in accordance with the cosine of the angle between the array axis and the vertical.

It will be clear, of course, that there is a special case of FIG. 2, where the EUs are spaced at equal distances and are detonated at equal time intervals (as in FIG. 1). In this case the downtraveling pulses will be in phase, and the up-traveling pulses will be in a time pattern. This time pattern can be determined and correlated with the received record as taught in this invention. The received record and the correlogram can then be further processed as has been taught above.

What is claimed is:

1. In an apparatus for generating seismic waves which includes a substantially vertical array of separate impulsive sources (ISs) spaced apart in a wave propagating medium, and at least a first seismic sensor, for converting the received seismic waves to electrical signals, said first seismic sensors spaced apart from said array, amplifier means, and recording means;
   the method of operation to provide optimum information of the subsurface, comprising the step of;
   (a) initiating sequentially the plurality of ISs in said vertical array in a first time sequence;
   (b) detecting the seismic waves at said first seismic sensor generated by said initiations after travel through the earth, and producing, and at least temporarily storing a first electrical signal; produced by said first seismic sensor;
   (c) determining the time intervals between downtraveling seismic waves from said ISs in said array and producing a second electrical signal; which is an electrical signal facsimile of said downtraveling seismic waves;
   (d) correlating said first electrical signal with said second electrical signal to produce a first correlogram;
   whereby said first correlogram will indicate the presence of upwardly reflected seismic waves from below said array, generated by the downtraveling seismic waves from said array.

2. The method as in claim 1 including the additional steps of;
   (e) determining the time intervals between the uptraveling seismic waves from said ISs in said array, and producing a third electrical signal; which is an electrical signal facsimile of said uptraveling seismic waves;
   (f) correlating said first electrical signal with said third electrical signal to produce a second correlogram;
   whereby said second correlogram will indicate the presence of upwardly reflected seismic waves from below said array; generated by the uptraveling seismic waves from said array after downward reflection from a reflecting interface above said array.

3. The method as in claim 2 including the additional step of correlating said first correlogram with said second correlogram.

4. The method as in claim 1 in which said array is initiated from the top IS downwardly to the bottom IS.

5. The method as in claim 1 in which said array is initiated from the bottom IS upwardly to the top IS.

6. The method as in claim 1 including a plurality of seismic sensors in a selected array, on or near the surface.

7. The method as in claim 1 in which the shortest time interval between successive initiations of said ISs is greater than the time of travel of said seismic waves in said wave propagating medium between adjacent ISs.

8. The method as in claim 7 in which the initiation time interval between at least one pair of adjacent ISs is different than the time interval between another pair of ISs.

9. The method as in claim 8 in which all the initiation time intervals between pairs of ISs are different.

10. The method as in claim 9 in which the time intervals in said sequence of time intervals increase with time after the first detonation.

11. The method as in claim 9 in which the successive time intervals in said sequence of time intervals decrease with time after the first initiation.

12. The method as in claim 9 in which the time intervals in said sequence of time intervals is random.

13. Apparatus for generating seismic waves which includes a seismic wave propagating medium and at least a first seismic sensor for receiving seismic waves from said apparatus after traveling through the earth, and to produce a first signal which is an electrical signal, which is a facsimile of the seismic waves received by said seismic sensor;
   (a) a substantially vertical array of impulsive sources (ISs) spaced apart, in said propagating medium;
   (b) means to initiate successively said ISs in a first known time sequence;
   (c) means to determine the time intervals between the downtraveling seismic waves from said array, and means to produce a second electrical signal, which is an electrical facsimile of said downtraveling seismic waves;
   (d) means to correlate said first signal with said second signal to produce a first correlogram.

14. The apparatus as in claim 13 and including
   (e) means to detect the time intervals between the uptraveling waves from the initiation of said array of ISs, to produce a third electrical signal, which is an electrical signal facsimile of said uptraveling seismic waves;
   (f) means to correlate said first electrical signal with said third electrical signal to provide a second correlogram.

15. The apparatus as in claim 14 including means to correlate said first correlogram with said second correlogram.

16. The apparatus as in claim 13 in which the spacings between adjacent ISs are equal.

17. The apparatus as in claim 13 in which at least two of the spacings between adjacent ISs are unequal.

18. The apparatus as in claim 13 in which said ISs are explosive units, and in which the timings of initiations are provided by delay cord.

19. The apparatus as in claim 13 in which said ISs are explosive units, and in which the timing of detonation is provided by a sequencing blaster.

20. The apparatus as in claim 13 in which said ISs are in the class of air guns and water guns and said medium is water.

21. The apparatus as in claim 13 in which said ISs are explosive units and said medium is the rock surrounding a borehole in the earth.

22. In a seismograph exploration system, including a seismic wave generator, comprising an array of a plurality of impulse sources (IS) which can be activated in the earth in a known time sequence, said ISs positioned at different depths below the surface of the earth, the depths of at least two being known, at least one seismic sensor spaced apart from said ISs, amplifier means and recording means, the method of operation to provide optimum information of the subsurface, comprising the steps of;
- (a) initiating sequentially the plurality of ISs in said vertical array in a first known time sequence;
- (b) detecting the seismic waves generated in the earth by said initiations, at a first sensor displaced from said array, and producing, and at least temporarily storing, a first electrical signal; produced by said first sensor;
- (c) producing a second electrical signal comprising a time series of electrical pulses, equal in number to said ISs, in a time sequence equal to said first time sequence, as modified by the relative vertical positions of said ISs and the known velocity of seismic waves in the earth;
- (d) correlating said first signal with said second signal to produce a first correlogram;

whereby said first correlogram will indicate the presence of upward reflected seismic waves from below said array, generated by the downtraveling seismic waves from said array.

23. The method as in claim 22 including the steps of;
- (e) detecting the uptraveling seismic waves from said array by a seismic sensor at the surface, and producing a third electrical signal;
- (f) correlating said first electrical signal with said third electrical signal to produce a second correlogram;

whereby said second correlogram will indicate the presence of upwardly reflected seismic waves from below said array; generated by the uptraveling seismic waves from said array after downward reflection from at least one reflecting interface above said array.

24. The method as in claim 23 including the additional step of correlating said first correlogram with said second correlogram.

25. The method as in claim 22 in which said ISs comprise explosive units (EU4) and all of said explosive units are positioned at different depths in a single borehole.

26. The method as in claim 22 in which said plurality of ISs are divided into at least two groups, each group positioned in a separate one of at least two laterally spaced vertical arrays.

27. The method as in claim 26 in which said lateral spacing of said arrays is less than the lateral spacings between sensor traces on the surface.

28. The method as in claim 26 in which the elevations of the surface of the earth above said at least two arrays are different, and including the additional step of determining the difference in travel time through the weathered layer, and utilizing this time difference in step (c).

29. The method as in claim 1 in which the time intervals between the downtraveling seismic waves from said array are determined by a seismic sensor positioned below the bottom IS.

30. The method as in claim 1 in which the time intervals between the downtraveling seismic waves from said array are determined by measuring the time intervals between each initiation and correcting these times in terms of the known seismic velocity in the earth.

31. The method as in claim 1 in which the time intervals between the downtraveling seismic waves from said array are determined from a seismic sensor positioned above the top IS, corrected for the known velocity of seismic waves in the earth.

32. The method as in claim 2 in which
- (a) the vertical spacings between said sources are equal;
- (b) the time intervals between initiation of each of said sources is equal to the time of travel of seismic waves in the earth between said source positions;
- (c) determining the time intervals between the uptraveling seismic waves from said array, and producing said third electrical signal; and
- (d) correlating said first electrical signal with said third electrical signal.

33. The method as in claim 1 in which the number of separate ISs in said array is at least 5.

34. The method as in claim 1 in which the number of separate ISs in said array is at least 10.

* * * * *